(12) United States Patent
Rice et al.

(10) Patent No.: US 7,440,174 B2
(45) Date of Patent: Oct. 21, 2008

(54) COHERENT FIBER DIFFRACTIVE OPTICAL ELEMENT BEAM COMBINER

(75) Inventors: Robert Rex Rice, Simi Valley, CA (US); Michael Gordon Wickham, Rancho Palos Verdes, CA (US); Joshua Elliott Rothenberg, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 35 days.

(21) Appl. No.: 11/361,352

(22) Filed: Feb. 24, 2006

(65) Prior Publication Data

US 2007/0201795 A1 Aug. 30, 2007

(51) Int. Cl.
*H01S 3/00* (2006.01)
*H01S 4/00* (2006.01)
*G02B 5/18* (2006.01)
*G01B 9/02* (2006.01)

(52) U.S. Cl. ............ 359/341.1; 359/566; 356/477; 372/29.016

(58) Field of Classification Search .............. 359/341.1, 359/566, 341.41; 356/477; 372/29.016
See application file for complete search history.

(56) References Cited

U.S. PATENT DOCUMENTS

| 4,552,435 A | 11/1985 | Von Bieren |
| 4,649,351 A | 3/1987 | Veldkamp |
| 5,121,400 A | 6/1992 | Verdiell |
| 5,694,408 A | 12/1997 | Bott |
| 6,366,356 B1 | 4/2002 | Brosnan et al. |
| 6,708,003 B1 | 3/2004 | Wickham et al. |
| 6,813,069 B2 * | 11/2004 | Rice et al. .......... 359/349 |
| 6,910,780 B2 * | 6/2005 | Vail et al. .......... 359/861 |
| 7,233,442 B1 * | 6/2007 | Brown et al. .......... 359/556 |

| 2005/0201429 A1 | 9/2005 | Rice et al. |

FOREIGN PATENT DOCUMENTS

EP 980123 A2 * 2/2000

OTHER PUBLICATIONS

Anderegg et al., "8-watt coherenctly phased 4-element fiber array", Advances in Fiber Devices Proceedings of SPIE, vol. 4974 (2003), pp. 1-6.*
Augst et al., "Coherent beam combining and phase noise measurements of ytterbium fiber amplifiers", Optics Letters, vol. 29, No. 5, Mar. 1, 2004, pp. 474-476.*
T.M. Shay et al., "First Experimental Demonstration of Phase Locking of Optical fiber Arrays by RF Phase Modulation," Proc. of SPIE vol. 5550, pp. 313-319 (2004).
Yum H N et al: "Demonstration of a Multiwave Coherent Holographic Beam Combiner in a Polymeric Substrate" Optics Letters, OSA, Optical Society of America, Washington, Washington, DC, US, vol. 30, No. 22, Nov. 15, 2005, pp. 3012-3014, XP001235477, ISSN: 0146-9592; Fig. 1B.
International Search Report for corresponding PCT/US2007/004898, completed Aug. 3, 2007 by Marco Ciarrocca of the EPO.

* cited by examiner

*Primary Examiner*—Eric Bolda
(74) *Attorney, Agent, or Firm*—Tarolli, Sundheim, Covell & Tummino LLP

(57) ABSTRACT

An optical beam combiner and a related method for its operation, in which multiple coherent input beams are directed onto a diffractive optical element (DOE) along directions corresponding to diffraction orders of the DOE, such that the DOE generates a single output beam in a direction corresponding to a desired diffraction order, and suppresses outputs in directions corresponding to unwanted diffraction orders. The phases of the input beams are actively controlled to ensure and maintain the condition that only a single diffraction mode is present in the output of the DOE.

30 Claims, 3 Drawing Sheets

COHERENT FIBER DIFFRACTIVE OPTICAL ELEMENT BEAM COMBINER

BACKGROUND OF THE INVENTION

This invention relates generally to high power lasers and, more particularly, to arrays of fiber amplifiers configured to produce a powerful composite beam. To obtain a desirably high total beam power, radiation emitting fibers are conventionally arranged in a two-dimensional array, sometimes referred to as a side-by-side array (SBSA), in which the phases of the emitters are controlled to render them mutually coherent. The beams combine in the far field as they diverge and diffract, forming the composite beam. The performance of such arrays is, however, significantly limited by the necessarily low "fill factor" of the array. Even if the fibers, which are cylindrical in shape, are closely packed in a hexagonal pattern, the fill factor is reduced by the spaces between adjacent fibers. One measure of the optical performance of such an array is the Strehl ratio of the composite beam, defined as the ratio of the on-axis intensity of the beam to the on-axis intensity that would have been obtained with a diffraction limited optical system with the same aperture and total power at the same range. A Strehl ratio of unity or 100% is indicative of an ideal beam, but this cannot be achieved in an SBSA, especially a fiber array, because the fill factor is generally significantly lower than 100%. For a closely packed array of cylindrical fibers, the fill factor as calculated by simple geometry is $\pi/(2\sqrt{3})$, which is approximately 90.7%. If one also takes into account that the radiation from each fiber end has a centrally peaked, near Gaussian, profile the effective fill factor is even further reduced, to approximately 74%.

For the typical two-dimensional array of emitting fibers and associated lenses, the resulting far field light distribution pattern has reduced on-axis power and a significant fraction of the emitted power is radiated as sidelobes that do not contribute to the available beam power. Another difficulty with the closely packed fiber array is that heat generated in the array cannot be easily conducted away to its perimeter, which leads to temperature gradients that can adversely affect alignment of the individual beams.

An alternative to coherent combination of fiber outputs is to combine the multiple beams incoherently, i.e., without regard to their relative phases. Spectral beam combining (SBC) uses a diffractive grating to combine multiple beams of different wavelengths. The grating functions like a prism in reverse, combining the beams of different wavelengths along a single output axis. Although the spectrally combined output has no unwanted sidelobes, it has a relatively wide spectral width and not all the spectral components may be equally transmissible through the atmosphere. Moreover, each source must have a fairly narrow spectral width if the technique is to be scaled up to a large number of input beams, and each source must have long-term frequency stability. For these and other reasons, SBC does not have good prospects as a high power laser source.

Although it is possible to improve the effective fill factor of a fiber array to some degree by the use of refractive optics, ideally it would be desirable to eliminate the effect that fill factor has on the Strehl ratio of a composite beam. The present invention provides a way to accomplish this. It would also be desirable to eliminate the thermal control problems associated with closely packed arrays of fibers and associated lenses. The present invention also achieves this goal.

SUMMARY OF THE INVENTION

The present invention uses a diffractive optical element (DOE) to combine output beams from multiple fiber emitters and generate a single output beam in a direction corresponding to a desired diffraction order. Briefly, and in general terms, the coherent fiber beam combiner of the invention comprises a plurality of optical amplifiers and light emitting fibers; and a master oscillator for generating a coherent input signal for use in all of the light emitting fibers, which together emit a plurality of combiner input beams. Importantly, the beam combiner of the invention also includes a diffractive optical element functioning as a beam combiner; and a collimating optic for redirecting output from the light emitting fibers onto the diffractive optical element, in directions corresponding respectively with a plurality of diffraction orders associated with the diffractive optical element. The diffractive optical element produces a single output beam derived from the combination of input beams. Finally, the combiner further comprises means for actively controlling the phases of the input beams to maintain the single output beam as an $N^{th}$ diffraction order output (e.g., $0^{th}$ diffraction order output), where N is an integer, and to minimize outputs at other diffraction orders.

In one disclosed embodiment of the invention the means for actively controlling the phases comprises a plurality of phase modulators coupled to the input beams; means for measuring phases of the individual input beams with respect to a phase reference, prior to incidence of the input beams on the diffractive optical element; and means for feeding back phase correction signals to the phase modulators, to maintain the phases of the input beams at desired relative values that result in minimizing diffraction order outputs other than the $N^{th}$ order output. The means for actively controlling the phases may further comprise means for sampling the single output beam; means for detecting unwanted diffraction order components in the output beam; and means for feeding back additional phase correction signals based on detection of any unwanted diffraction order components in the output beam.

In another disclosed embodiment of the invention, the means for actively controlling the phases comprises means for sampling the single output beam; means for uniquely identifying input beam constituents in the single output beam sample; means for generating separate phase measurements for each of the input beams, based on identified constituent components in the output beam sample; and means for adjusting the phases of the individual input beams based on the phase measurements generated. In this embodiment, each input beam is separately maintained at its desired phase setting, based on measurements made in the single output beam sample, rather than in the separate beams before their combination.

The diffractive optical element may be a transmissive diffractive grating or a reflective diffractive grating. The reflective form is preferred for high power applications because access to its rear face facilitates heat dissipation.

The invention may also be defined as a method for combining a plurality of beams from a plurality of fiber emitters. Briefly, the method comprises the steps of generating a master oscillator optical signal; coupling the master oscillator signal to a plurality of optical amplifiers and light emitting fibers; collimating light beams emitted by the fibers and redirecting these light beams as input beams to a diffractive optical element, in directions corresponding to a plurality of diffraction orders associated with the diffractive optical element; combining the input beams in the diffractive optical element; outputting from the diffractive optical element a single output beam derived from the combination of input beams; and actively controlling the phases of the input beams to maintain the single output beam as an $N^{th}$ diffraction order output and to minimize outputs at other diffraction orders.

It will be appreciated from this summary that the present invention represents a significant advance in the field of high energy lasers. In particular, the invention provides a convenient alternative to two-dimensional arrays of fiber emitters and lenses. Instead, a one-dimensional array or two-dimensional array of fiber emitters has its emitted beams redirected by a single optic onto a diffractive optical element, which, if the phases of the beams are actively controlled, results in the generation of a single output beam containing most of the energy of the constituent input beams. It will moreover be recognized that, while the use of a single diffractive optical element to both collimate and combine the beams from the several fibers or amplifiers is distinctly advantageous, two optics, one of which is diffractive, could be used. Other aspects and advantages of the invention will become apparent from the following more detailed description, taken in conjunction with the accompanying drawings.

DETAILED DESCRIPTION OF THE INVENTION

Figure 1A:
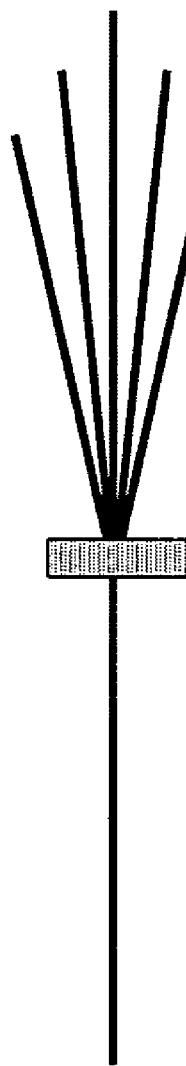
FIGS. 1A-1D are diagrams showing various input and output beam configurations for a diffractive optical element (DOE).

As shown in the drawings for purposes of illustration, the present invention is concerned with high power laser systems in which beams emitted from multiple fiber amplifiers are combined by means of a diffractive optical element (DOE). Since the use of a DOE is central to the invention, a brief summary of diffractive grating principles would be useful at this point.

It is well known that light impinging on a plate having multiple parallel slits is diffracted in such a manner that light emerging from the multiple slits forms a characteristic interference pattern, with one central bright band and multiple, equally spaced bright bands on each side of the central band. The central band is referred to as the $0^{th}$ diffraction order output, the next adjacent bands are referred to as being of diffraction orders +1 and −1, the next bands are said to of diffraction orders +2 and −2, and so forth. A transmissive diffractive grating is basically an opaque plate having a large number of parallel slits through which light is transmitted and diffracted. The number of slits in the grating does not affect the diffraction angles of the various modes but a larger number of slits results in more distinctly defined bright bands in the resultant interference pattern. While this explanation is provided with reference to a regular spacing of transmissive slits in an opaque plate, the principle applies equally well to a regular spacing of phase steps or optical path differences (OPDs) in a transmissive plate or a reflective surface. For monochromatic light, the bright interference bands correspond precisely to angularly spaced diffraction orders. The angular spacing of the diffraction orders is dependent on both the wavelength of the light and the slit spacing. If the incident light contains multiple wavelengths, each output order or mode is angularly spread in accordance with the different wavelengths and the bright bands may overlap. One application of diffractive gratings is to spectrally separate a light beam into its constituent wavelengths. A diffractive grating may also be used in reverse to combine multiple wavelengths into a single beam, referred to as spectral beam combination. A diffractive grating may be reflective instead of transmissive. Instead of slits, the reflective grating has a large number of parallel, equally spaced reflective surfaces that are analogous to the slits in a transmissive grating.

As in the context of the present invention, a diffractive grating may also be used to combine multiple beams of essentially the same wavelength into a single composite beam. In this case, multiple input beams must be precisely aligned in the angular paths corresponding with the various diffraction orders. If the phases of these input beams are appropriately selected and controlled, the diffractive grating will produce an output beam that combines practically all of the power of the input beams. The proportion of total input power that appears in the output beam is a measure of the efficiency of the grating. Other power loss is associated with parasitic beams of an unwanted order. Energy not appearing in the output beam must be dissipated as heat in some manner. Therefore, a reflective grating can be employed in high power applications because it is easier to couple to a thermal path for heat dissipation to remove heat without generating transverse temperature gradients.

Figure 1B:
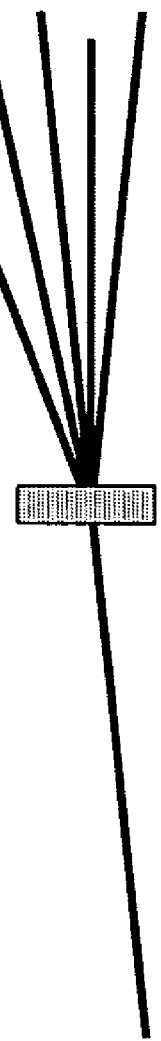

FIG. 1A is a diagram showing a conventional use of a DOE to split a single input beam into five output beams, as an example, having diffraction orders +2, +1, 0, −1 and −2. FIG. 1B shows the same DOE with the single input beam shifted to the −1 order position. The result is still five output beams but with each shifted by one order, to orders +3, +2, +1, 0 and −1.

Figure 1C:
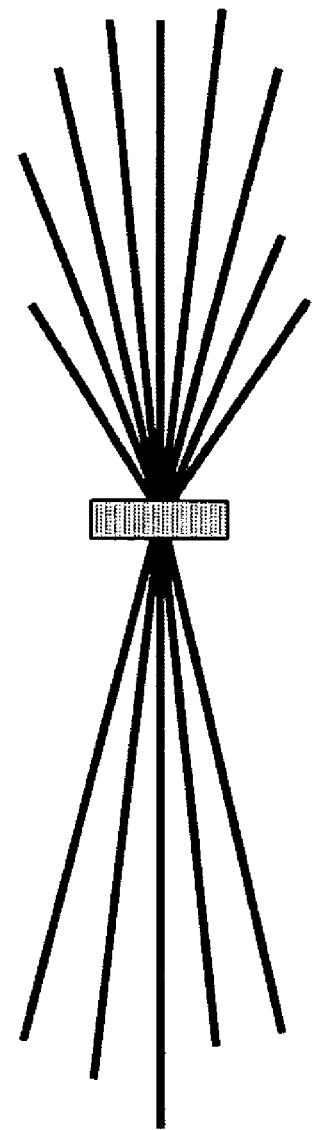

FIG. 1C shows the same DOE but with five incoherent input beams aligned in the order positions +2, +1, 0, −1 and −2. This results in nine output beams in total. Each of the input beams produces five output beams but the sets of five output beams overlap and result in nine output beams at positions corresponding to orders +4 through −4.

Figure 1D:
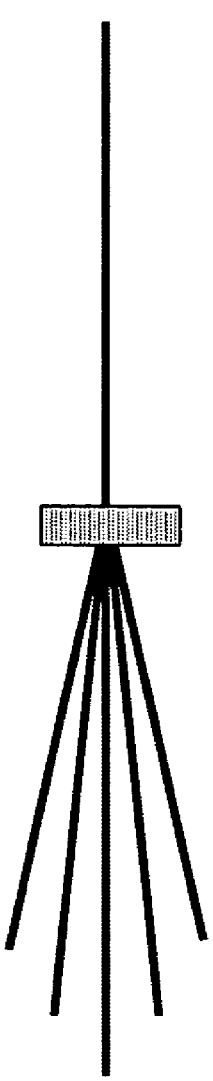

Finally, FIG. 1D shows the configuration in which the DOE is used in the present invention, with five input beams aligned at positions corresponding to orders +2 through −2, and a single output aligned at the $0^{th}$ order position.

Figure 2:
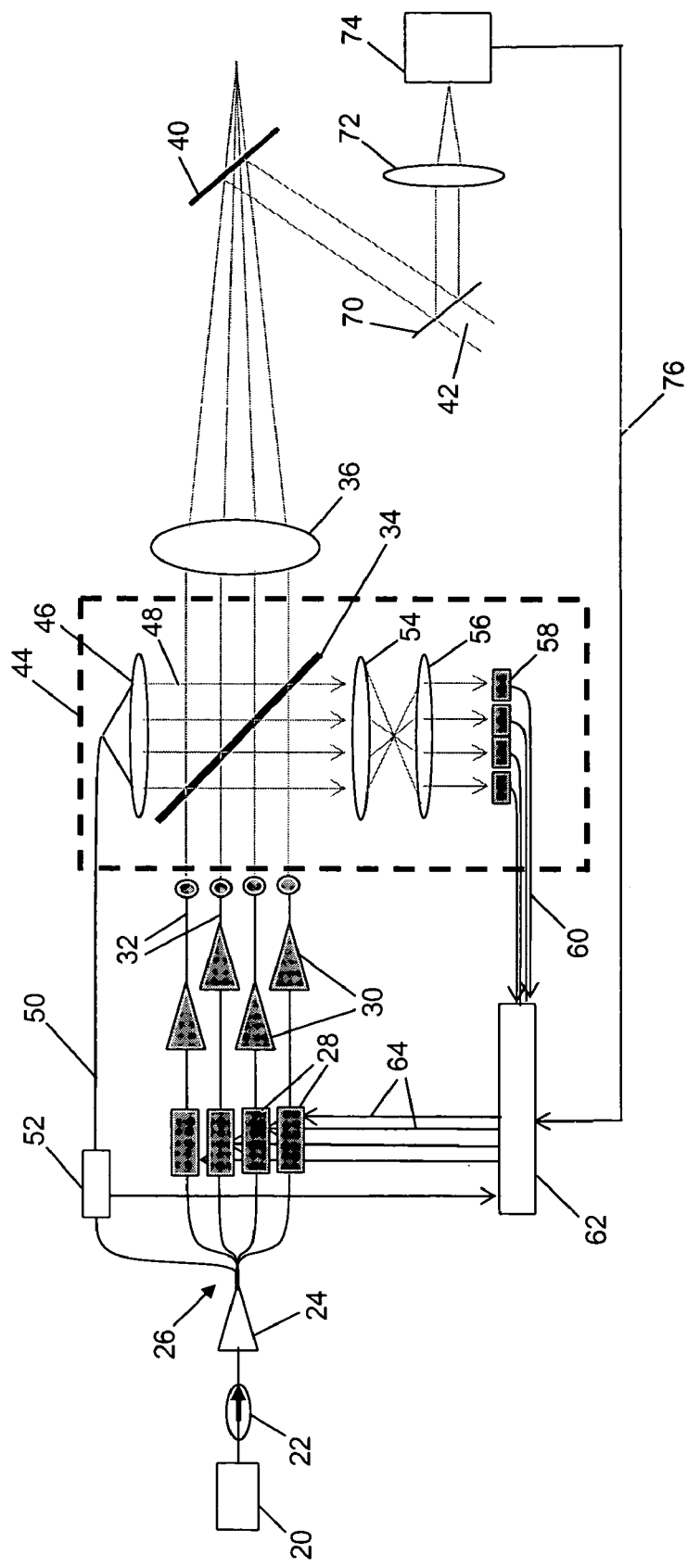
FIG. 2 is a block diagram of a coherent beam combining architecture using a DOE in accordance with the invention.

FIG. 2 diagrammatically depicts the DOE beam combining architecture of the present invention. The configuration includes a master oscillator 20, an optical isolator 22 to protect the master oscillator, a pre-split amplifier 24 and an optical splitter shown diagrammatically at 26. Optical signals at the master oscillator frequency are supplied to multiple phase modulators 28 and thence to multiple amplifiers 30, which are preferably polarization-maintaining (PM) amplifiers. The amplifiers 30 are coupled to respective fiber emitters 32. The fiber emitters 32 may be physically aligned by any appropriate technique, such as by positioning the fiber ends in V-grooves in a silicon block (not shown). The associated fiber emitters 32 can be configured in a one-dimensional array or two-dimensional array based on a desired implementation. A two-dimensional array can be configured as a plurality of one-dimensional arrays separated by thermal conductors there between to transport heat generated by the associated fiber emitters 32. The thermal conductors can be, for example, a silicon or copper plate in which the fibers emitters 32 reside. Light from the fiber emitters 32 passes through a beam-splitting mirror 34 and thence to a collimating optic 36, such as a convex lens. The optic 36 redirects the beams from the fiber emitters 32 onto a DOE combiner 40, such that each beam is aligned along an appropriate diffraction order direction for the DOE combiner. With appropriate phasing of the input beams, as discussed below, the DOE combiner 40 produces a single output beam 42 along the $0^{th}$ order direction of the DOE.

Phase detection of the input beams is effected in components contained within block 44 in FIG. 2. These components include a collimating lens 46, which produces broad cross-section reference beam 48 from an input beam 50 derived from the master oscillator 20, through the splitter 26. The input beam 50 is frequency shifted by a frequency shifter 52. This collimated reference beam 48 passes through the beam splitting mirror 34 and image relay lenses 54 and 56, to impinge on a plurality of heterodyne detectors 58. Also impinging on the detectors 58 are respective beam samples from the input beams emitted by the fiber emitters 32 and sampled by the mirror 34. The detectors 58 generate phase difference signals on lines 60, which are coupled to a phase controller 62. The latter generates phase control signals on lines 64 to the phase modulators 28. The specific manner in which this arrangement makes phase adjustments to the input signals is described in U.S. Pat. No. 6,366,356, entitled "High Average Power Fiber Laser System with High-Speed, Parallel Wavefront Sensor" and assigned to the same assignee as the present invention. The entire contents of U.S. Pat. No. 6,366,356 is incorporated by reference into this description.

The appropriate phase settings for the input beams emitted by fibers 32 are theoretically known from the geometry of system, including the path lengths for each of the input beams. Once the input beams have been set to and maintained at the relative phases needed to provide a single output beam along the $0^{th}$ order direction of the DOE combiner 40, the system should continue to operate correctly. An additional feedback control loop, discussed in the next paragraph, may be used to make additional phase corrections based on measurements made in the output from the DOE combiner 40.

The architecture of FIG. 2 further includes a far-field diagnostic subsystem, including a beam sampler 70 to sample the output beam 42, a camera lens 72 to image the output beam sample, and a diagnostic module 74 that examines the nature of the output beam. In one embodiment of the invention, the diagnostic module 74 detects any power in unwanted diffraction order directions and, depending on whether such power is detected, makes periodic adjustments in the input signal phases by feeding back control signals over line 76 to the phase controller 62. The feedback line 76 may also be employed to change the selection of input beam phases to a different set of phases that results in the output beam 42 being directed along a different (not the $0^{th}$) diffraction order direction.

It is to be appreciated that the phase controller 62 can be configured to alter the specific phases of the input beams to direct and steer the output beams to a different diffraction order other than the 0th diffraction order direction, such as one of a +2, +1, −1, −2 diffraction order. In this manner, the optic 36 can redirect the beams from the fiber emitters 32 onto the DOE combiner 40, such that each beam is aligned along a selected diffraction order direction for the DOE combiner that is different than the $0^{th}$ order direction of the DOE. With appropriate phasing of the input beams, as discussed above, the DOE combiner 40 can produce a single output beam 42 along an Nth order direction of the DOE combiner, where N is an integer. This allows for the single output beam to be steered rapidly along two-dimensions without moving the coherent beam combining architecture.

Although, FIG. 2 is illustrated with respect to light emitting mediums in the form of light emitting fibers, the present invention can employ other light emitting mediums, such as single mode amplifiers, slabs, rods and waveguides to name a few.

Figure 3:
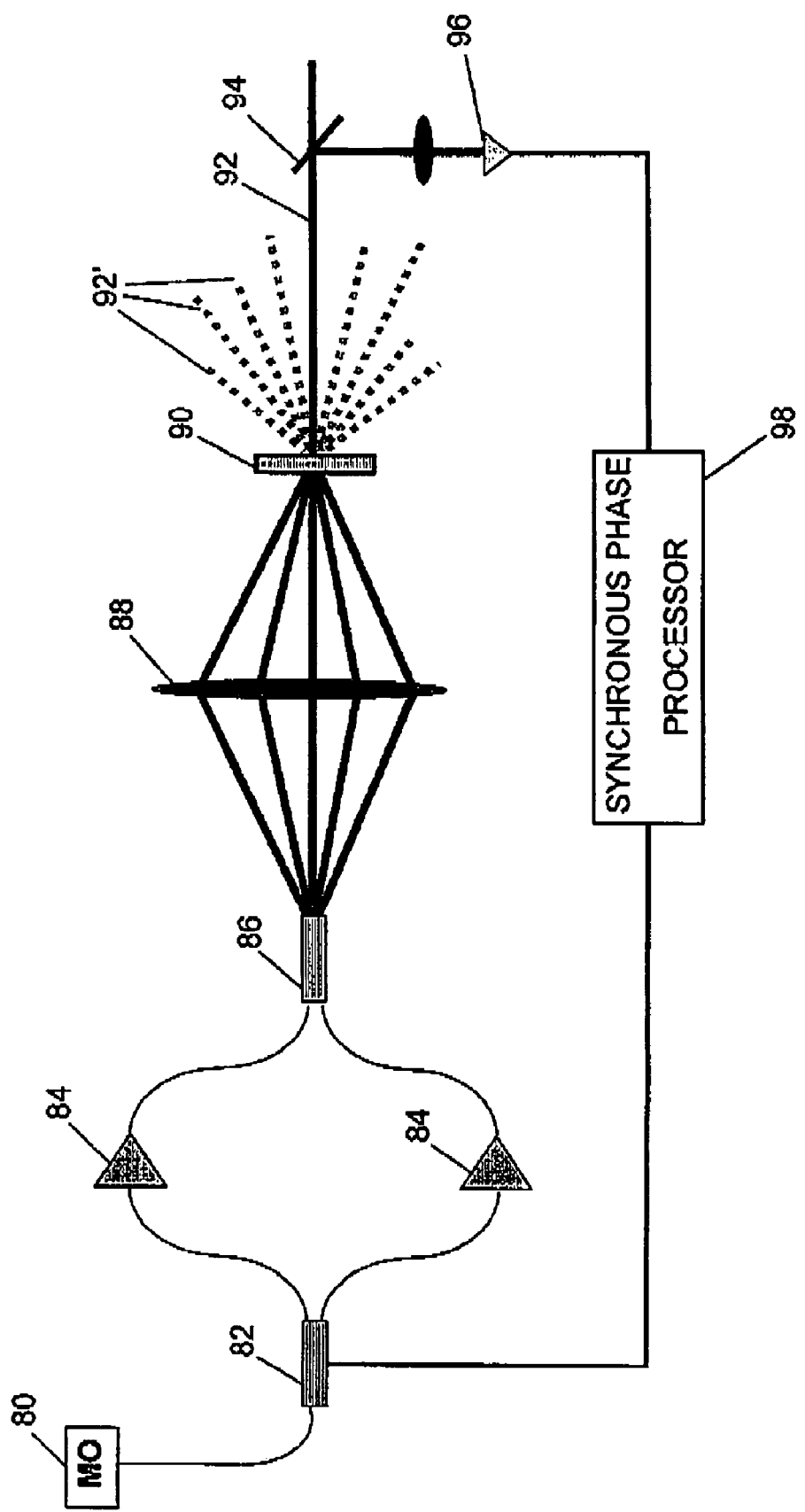
FIG. 3 is an alternative block diagram of a coherent beam combining architecture using a DOE in accordance with the invention.

FIG. 3 shows a slightly different architecture for the DOE beam combining system of the invention, in which phase control of the input beams is effected by detecting the individual phases of the constituent components of the output beam. The system includes a master oscillator 80 feeding a plurality of phase modulators 82, a plurality of amplifiers 84 and an equal number of fiber emitters 86 formed into a one-dimensional array. It is to be appreciated that a two-dimensional array can be employed with appropriate thermal conductors. A collimating optic 88 redirects light emitted from the fibers 86 onto a DOE combiner 90, here shown as a transmissive element. The DOE combiner 90 produces a single output beam 92 in the $0^{th}$ order direction and suppresses other orders, indicated at 92'. The output beam 92 is sampled by a beam splitter 94. The output signal sample is detected in a single detector 96 and a corresponding electrical signal is coupled to a synchronous phase processor 98. The latter generates phase control signals to control the phase modulators 82. The DOE combiner 90 provides beams that are overlapped. Additionally, the wavefronts from each of the beams are rendered parallel by the DOE combiner 90, and hence provide a good strong heterodyne signal.

Phase control in the FIG. 3 embodiment relies on the technique disclosed in U.S. Pat. No. 6,708,003, entitled "Optical Energy Transmission System Utilizing Precise Phase and Amplitude Control," and assigned to the same assignee as the present invention. The entire contents of U.S. Pat. No. 6,708,003 is incorporated by reference into this description. In essence, this technique of phase control maintains phase control of each of the input beams individually. Each input beam is identified or "tagged" uniquely, either by adding a unique frequency component or, as in the reference patent disclosure, by uniquely encoding each input beam using code division multiple access (CDMA) technology that is well known in wireless telephony. Because each input beam constituent is uniquely tagged, it is also uniquely identifiable in the composite output beam sample. Thus, the synchronous phase processor 98 includes means for decoding and identifying the constituent components of the output beam 92, and generating appropriate control signals for the individual phase modulators 82. In effect, the phases of the input beams are controlled to suppress all the unwanted diffraction orders 92' and leave only the $0^{th}$ order output beam 92. It is to be appreciated that the synchronous phase processor 98 can be configured to alter the specific phases of the input beams to direct and steer the output beams to a different diffraction order, than the 0th diffraction order direction, such as one of a +2, +1, −1, −2 diffraction order.

It will be appreciated from the foregoing that the present invention will enable coherently combining input beams from a fiber amplifier array in a single DOE beam combiner, and thereby provide scalability to heavy industrial and high energy laser systems applications. In the disclosed embodiments of the invention, the fibers in a one-dimensional array or a two-dimensional array with appropriate thermal conductors are actively phased and the DOE is used to combine the individual beams using only a single collimating lens in such a way that the combined beam has a Strehl Ratio (SR) essentially the same as that of a single amplifier. Moreover, thermal effects in the fiber array and subsequent optics in the beam train are significantly easier to manage than in a conventional two-dimensional array of fibers and lenslets. The disclosed fiber beam combing approach offers several innovative features that provide major benefits, including but not limited to the following:

a) The fiber DOE beam combiner achieves a single combined beam with high efficiency and a Strehl Ratio essentially equal to that of a single fiber amplifier beam.

b) The system operates at a single optical frequency to mitigate atmospheric absorption effects that are encountered when using a broadband spectrally beam combined source.

c) The invention replaces the conventional two-dimensional lens array with a large reflective optic that can tolerate high power, which reduces alignment sensitivity and eliminates underfill losses associated with two-dimensional fiber arrays.

d) The invention uses a one-dimensional fiber array or a two-dimensional array with appropriate thermal conductors to allow superior fiber thermal management and enable a simple one-dimensional design for the DOE.

e) The invention uses a beam phasing technology that can be varied to provide an output beam that is directed and steered along a specified order.

It is to be appreciated that while the description of the disclosed invention has focused on an implementation in which the light emitting fibers are physically disposed as a one-dimensional spaced apart array for thermal advantage, the capability of a DOE to combined coherent beams is not so constrained; rather, a two dimensional array of fiber emitters (with appropriate thermal conductors) can likewise be combined into a single output beam for further power scaling by a straightforward extension of the concepts and methods described in this teaching.

Accordingly, it will be appreciated that the present invention provides a significant advance in the field of high energy lasers for industrial or military use. In particular, the invention provides a compact and robust technique for efficiently combining a large number of beams from fiber emitters into a single coherent beam of high power. It will also be appreciated that although specific embodiments of the invention have been described in detail for purposes of illustration, various modifications may be made without departing from the spirit and scope of the invention. Therefore, the invention should not be limited except as by the appended claims.

The invention claimed is:

1. A coherent fiber beam combiner, comprising:
a plurality of optical amplifiers and light emitting fibers;
a master oscillator configured to generate a coherent input signal for use in all of the light emitting fibers, which together emit a plurality of combiner input beams;
a diffractive optical element configured to function as a beam combiner;
a collimating optic configured to redirect output from the light emitting fibers onto the diffractive optical element, in directions corresponding to a plurality of diffraction orders associated with the diffractive optical element, wherein the diffractive optical element produces a single output beam derived from the combination of input beams; and
means for actively controlling the phases of the input beams to maintain the single output beam as a $N^{th}$ diffraction order output and to minimize outputs at other diffraction orders, where N is an integer.

2. A coherent fiber beam combiner as defined in claim 1, wherein the means for actively controlling the phases comprises:
a plurality of phase modulators coupled to the input beams;
means for measuring phases of the individual input beams with respect to a phase reference, prior to incidence of the input beams on the diffractive optical element; and
means for feeding back phase correction signals to the phase modulators, to maintain the phases of the input beams at desired relative values that result in minimizing diffraction order outputs other than the desired $N^{th}$ diffraction order output.

3. A coherent fiber beam combiner as defined in claim 2, wherein the means for actively controlling the phases further comprises:
means for sampling the single output beam;
means for detecting unwanted diffraction order components in the output beam; and
means for feeding back additional phase correction signals based on detection of any unwanted diffraction order components in the output beam.

4. A coherent fiber beam combiner as defined in claim 3, wherein the means for sampling the single output beam, the means for detecting unwanted diffraction order components, and the means for feeding back additional phase correction signals, are operative periodically, to make periodic adjustments to the phases of the input beams.

5. A coherent fiber beam combiner as defined in claim 2, wherein the means for actively controlling the phases comprises:
means for sampling the single output beam;
means for uniquely identifying input beam constituents in the single output beam sample; and
means for generating separate phase adjustments for each of the input beams, based on identified constituent components in the output beam sample; and
means for adjusting the phases of the individual input beams based on the phase adjustments generated;
whereby each input beam is separately maintained at its desired phase setting, based on measurements made in the single output beam sample.

6. A coherent fiber beam combiner as defined in claim 1, wherein the means for actively controlling the phases is configured to select and switch between one or more desired diffraction order outputs.

7. A coherent fiber beam combiner as defined in claim 1, wherein the $N^{th}$ diffraction order output is the $0^{th}$ diffraction order output.

8. A coherent fiber beam combiner as defined in claim 1, wherein the diffractive optical element is a transmissive diffractive grating.

9. A coherent fiber beam combiner as defined in claim 1, wherein the diffractive optical element is a reflective diffractive grating.

10. A coherent light beam combiner of claim 1, wherein the plurality of input combiner beams each have a wavelength that is substantially equal.

11. A coherent light beam combiner of claim 1, wherein the single output beam is derived from the combination of input beams based on the input beams overlapping each other, such that the phases of the input beams that overlap to form the single output beam are synchronous.

12. A coherent light beam combiner of claim 1, wherein the single output beam has a single optical frequency.

13. A method for combining a plurality of beams from a plurality of fiber emitters, the method comprising:
generating a master oscillator light signal;
coupling the master oscillator signal to a plurality of optical amplifiers and light emitting fibers;

collimating coherent light beams emitted by the fibers and redirecting these coherent light beams as input beams to a diffractive optical element, in directions corresponding to a plurality of diffraction orders associated with the diffractive optical element;

combining the input beams in the diffractive optical element;

outputting from the diffractive optical element a single output beam derived from the combination of input beams; and actively controlling the phases of the input beams to maintain the single output beam as a $N^{th}$ diffraction order output, where N is an integer, and to minimize outputs at other diffraction orders.

14. A method as defined in claim 13, wherein the step of actively controlling the phases comprises:

phase modulating the input beams in a plurality of phase modulators;

measuring phases of the individual input beams with respect to a phase reference, prior to incidence of the input beams on the diffractive optical element; and feeding back phase correction signals to the phase modulators, to maintain the phases of the input beams at desired relative values that result in minimizing diffraction order outputs other than the $N^{th}$ order output.

15. A method as defined in claim 13, wherein the step of actively controlling the phases further comprises:

sampling the single output beam;

detecting unwanted diffraction order components in the sampled output beam; and feeding back additional phase correction signals based on detection of any unwanted diffraction order components in the sampled output beam.

16. A method as defined in claim 15, wherein the steps of sampling the single output beam, detecting unwanted diffraction order components, and feeding back additional phase correction signals, are performed periodically, to make periodic adjustments to the phases of the input beams to minimize diffraction order outputs other than the $N^{th}$ order output.

17. A method as defined in claim 13, wherein the step of actively controlling the phases comprises:

sampling the single output beam;

uniquely identifying input beam constituents in the single output beam sample;

generating separate phase adjustments for each of the input beams, based on identified constituent components in the output beam sample; and adjusting the phases of the individual input beams based on the phase adjustments generated;

whereby each input beam is separately maintained at its desired phase setting, based on measurements made in the single output beam sample.

18. A method as defined in claim 13, wherein the diffractive optical element is a transmissive diffractive grating.

19. A method as defined in claim 13, wherein the diffractive optical element is a reflective diffractive grating.

20. A method as defined in claim 13, wherein the phase modulating the input beams in a plurality of phase modulators further comprising selecting and switching between one or more desired diffraction order outputs.

21. A method as defined in claim 13, wherein the $N^{th}$ diffraction order output is the $0^{th}$ diffraction order output.

22. A method as defined in claim 13, wherein the input beams each have a wavelength that is substantially equal.

23. A method as defined in claim 13, wherein outputting the single output beam comprises overlapping the input beams such that the phases of the input beams that overlap to form the single output beam are synchronous.

24. A method as defined in claim 13, wherein the single output beam has a single optical frequency.

25. A coherent light beam combiner, comprising:

a plurality of optical amplifiers and light emitting mediums;

a master oscillator configured to generate a coherent input signal for use in all of the light emitting mediums, which together emit a plurality of combiner input beams;

a diffractive optical element configured to function as a beam combiner;

a collimating optic configured to redirect output from the light emitting mediums onto the diffractive optical element, in directions corresponding to a plurality of diffraction orders associated with the diffractive optical element, wherein the diffractive optical element produces a single output beam derived from the combination of input beams; and means for actively controlling the phases of the input beams to maintain the single output beam as a $N^{th}$ diffraction order output and to minimize outputs at other diffraction orders, where N is an integer.

26. A coherent light beam combiner of claim 25, in which the light emitting medium is at least one of fight emitting fibers, single mode amplifiers, slabs, rods and waveguides.

27. A coherent light beam combiner of claim 25, wherein the plurality of input combiner beams each have a wavelength that is substantially equal.

28. A coherent light beam combiner of claim 25, wherein the single output beam is derived from the combination of input beams based on the input beams overlapping each other, such that the phases of the input beams that overlap to form the single output beam are synchronous.

29. A coherent light beam combiner of claim 25, wherein the single output beeam has a single optical frequency.

30. A coherent light beam combiner of claim 25, wherein the means for actively controlling the phases is configured to individually alter the phases of the input beams to change the single output beam from the $N^{th}$ diffraction order output to a different diffraction order output.

* * * * *